United States Patent
Jang et al.

(10) Patent No.: US 9,991,755 B2
(45) Date of Patent: Jun. 5, 2018

(54) MOTOR UNIT HAVING INSULATION MEMBER

(71) Applicants: Hyundai Motor Company, Seoul (KR); Kia Motors Corporation, Seoul (KR)

(72) Inventors: Yongsung Jang, Gyeonggi-Do (KR); Sangjin Park, Gyeonggi-Do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 252 days.

(21) Appl. No.: 14/939,496

(22) Filed: Nov. 12, 2015

(65) Prior Publication Data

US 2016/0294241 A1  Oct. 6, 2016

(30) Foreign Application Priority Data

Mar. 30, 2015  (KR) .................. 10-2015-0044456

(51) Int. Cl.
*H02K 3/34* (2006.01)
*H02K 3/487* (2006.01)

(52) U.S. Cl.
CPC ........... *H02K 3/345* (2013.01); *H02K 3/487* (2013.01)

(58) Field of Classification Search
CPC .. H02K 3/34; H02K 3/28; H02K 7/00; H02K 3/345; H02K 3/487
USPC ............................................. 310/214, 215
See application file for complete search history.

(56) References Cited

U.S. PATENT DOCUMENTS

| | | | | |
|---|---|---|---|---|
| 3,852,137 A | * | 12/1974 | Balke ............... | H02K 3/487 156/182 |
| 3,952,406 A | * | 4/1976 | Madsen ............ | H02K 3/48 29/421.1 |
| 3,976,901 A | * | 8/1976 | Liptak ............... | H02K 3/48 310/214 |
| 4,159,562 A | * | 7/1979 | Liptak ............... | H02K 3/48 29/596 |
| 4,160,926 A | * | 7/1979 | Cope ................ | H02K 3/345 174/110 N |

(Continued)

FOREIGN PATENT DOCUMENTS

| | | | |
|---|---|---|---|
| EP | 1168571 A2 * | 1/2002 | ............... H02K 3/22 |
| JP | 07-245896 A | 9/1995 | |

(Continued)

*Primary Examiner* — Naishadh Desai
(74) *Attorney, Agent, or Firm* — Mintz Levin Cohn Ferris Glovsky and Popeo, P.C.; Peter F. Corless

(57) ABSTRACT

A motor unit having an insulation member is provided. The motor unit includes rotor cores formed in a radial direction on an exterior circumference of a motor shaft and a slot formed therebetween. Shoes are formed in a rotation direction and an opposite rotation direction of the motor shaft at an outer end portion of each rotor core, and an exposure passage is formed therebetween. A bottom surface is formed proximate to the motor shaft within the slot. Further first and second interior surfaces are connected to the bottom surface and are formed at the rotation direction side and the opposite rotation direction side of the motor shaft within the slot. An insulation member contacts the first and second interior circumferences of the shoes adjacent to the bottom surface and is disposed proximate to at least one portion of the exposure passage.

8 Claims, 4 Drawing Sheets

(56) References Cited

U.S. PATENT DOCUMENTS

| | | | | |
|---|---|---|---|---|
| 4,163,166 A * | 7/1979 | Kamiya | H02K 3/32 | 310/214 |
| 4,217,690 A * | 8/1980 | Morreale | H02K 1/146 | 29/596 |
| 4,390,806 A * | 6/1983 | O'Brien | H02K 3/24 | 310/145 |
| 4,922,165 A * | 5/1990 | Crawford | H02K 3/345 | 310/215 |
| 5,030,870 A * | 7/1991 | Wichmann | H02K 3/40 | 310/179 |
| 5,979,087 A * | 11/1999 | Bell | H02K 3/487 | 310/196 |
| 6,140,733 A * | 10/2000 | Wedde | H02K 3/345 | 310/196 |
| 6,201,332 B1 * | 3/2001 | Umeda | H02K 3/12 | 310/179 |
| 6,288,460 B1 * | 9/2001 | Fakult | H02K 3/24 | 310/179 |
| 6,400,056 B1 * | 6/2002 | Naka | H02K 3/345 | 310/215 |
| 6,414,413 B1 * | 7/2002 | Arai | H02K 1/146 | 29/596 |
| 8,013,490 B2 * | 9/2011 | Hino | H02K 3/34 | 310/194 |
| 2001/0030483 A1 * | 10/2001 | Masumoto | H02K 1/165 | 310/216.008 |
| 2002/0047457 A1 * | 4/2002 | Yoshikawa | H02K 3/345 | 310/215 |
| 2004/0187293 A1 * | 9/2004 | Bradfield | H02K 1/165 | 29/596 |
| 2005/0116571 A1 * | 6/2005 | Ichikawa | H02K 3/12 | 310/201 |
| 2008/0246354 A1 * | 10/2008 | Asao | H02K 3/345 | 310/45 |
| 2008/0284262 A1 * | 11/2008 | Nelson | C08J 5/10 | 310/52 |
| 2009/0146513 A1 * | 6/2009 | Bremner | H02K 3/325 | 310/64 |
| 2010/0079028 A1 * | 4/2010 | Turner | H02K 3/487 | 310/214 |
| 2010/0141079 A1 * | 6/2010 | Chu | H02K 3/325 | 310/215 |
| 2011/0080066 A1 * | 4/2011 | Doi | H02K 1/276 | 310/156.43 |
| 2011/0109188 A1 * | 5/2011 | Shaver | H02K 3/34 | 310/215 |
| 2012/0091848 A1 * | 4/2012 | Sakai | H02K 1/2766 | 310/156.43 |
| 2012/0326550 A1 * | 12/2012 | Kinpara | H02K 21/14 | 310/156.54 |
| 2014/0210302 A1 * | 7/2014 | Vodak | H02K 3/44 | 310/214 |

FOREIGN PATENT DOCUMENTS

| | | |
|---|---|---|
| JP | 2000-175394 A | 6/2000 |
| JP | 2002-330564 A | 11/2002 |
| JP | 2008-289284 A | 11/2008 |
| JP | 5608417 B2 | 10/2014 |
| KR | 10-2006-0078875 | 7/2006 |
| KR | 10-2014-0079535 A | 6/2014 |

* cited by examiner

MOTOR UNIT HAVING INSULATION MEMBER

CROSS-REFERENCE TO RELATED APPLICATION

This application claims priority to and the benefit of Korean Patent Application No. 10-2015-0044456 filed in the Korean Intellectual Property Office on Mar. 30, 2015, the entire contents of which are incorporated herein by reference.

BACKGROUND (a) Field of the Invention

The present invention relates to a motor unit having an insulation member disposed within a rotor slot to insulate between a coil and a rotor, and may reduce assembly costs and improves operation stability by modifying a structure and a shape thereof.

(b) Description of the Related Art

Generally, as well known in the related art, an electrical motor converts electrical energy into mechanical energy, and a rotor is a component that substantially converts electrical energy into mechanical energy by moving relative to a magnetic field. For example, a rotor rotates based on a rotational axis in a commutator motor, etc. The rotor includes a core in which a plurality of slots that open outward in a radial direction are stacked to be insulated and a coil is wound onto the slots.

As shown in the accompanying drawings, a rotor for an electrical motor includes a core and a coil wound inside slots formed in the core. A slot-insulating sheet formed as a film-shaped insulator (e.g., insulation member) is inserted within each slot. The coils are insulated from each other, and a wedge is coupled to an opening of each slot to block (e.g., obstruct) the opening. However, in such a conventional rotor for an electrical motor, a slot-insulating sheet is inserted along a shape of an interior wall of a slot to insulate a core and a coil from each other within the interior of the slot, and a wedge is coupled to an opening of the slot to block the opening. Due to separation or distortion of parts of the electrical motor, the reliability of the wedge and the slot-insulating sheet may deteriorate and costs may increase.

The above information disclosed in this section is merely to enhance the understanding of the background of the invention and therefore it may contain information that does not form the prior art that is already known in this country to a person of ordinary skill in the art.

SUMMARY

The present invention provides a motor unit having an insulation member that may decrease a separation possibility of parts thereof, enhance operation stability, and effectively insulate a rotor coil and a rotor by improving a structure and a shape of a slot-insulating sheet.

According to one aspect, an exemplary embodiment of the present invention may include a motor unit having an insulation member. The motor unit may include rotor cores formed in a radial direction on an exterior circumference of a motor shaft and having a slot formed therebetween. A plurality of shoes formed in a rotation direction and an opposite rotation direction of the motor shaft at an outer end portion of each rotor core, and between which an exposure passage may be formed. A bottom surface formed near the motor shaft within the slot; first and second interior surfaces respectively connected to the bottom surface and formed at the rotation direction side and the opposite rotation direction side of the motor shaft within the slot; and an insulation member that contacts (e.g., abuts) first and second interior circumferences of the shoes adjacent to the bottom surface and disposed to close (e.g., obstruct) at least one portion of the exposure passage.

The insulation member may include a bottom member that contacts the bottom surface formed near a central portion of the motor shaft within a space of the slot; and first and second interior surface members integrally bent and formed at adjacent sides of the bottom member and contact the first and second interior surfaces of the slot. The first and second extension members may be integrally bent and formed within the first and second interior surface members, respectively and contact the first and second interior circumferences of the shoes, and respectively extend in a direction of a central axis of the exposure passage.

The motor unit having the insulation member may further include a wedge that closes (e.g., obstructs) the exposure passage, wherein opposite end portions of the wedge may be respectively coupled (e.g., fixedly inserted) into grooves respectively formed in a plurality of adjacent surfaces of the shoes in a rotation direction of the motor shaft. The rotor core, the shoe, and the wedge may each be a conductor, and the insulation member may be an insulator. The insulation member may be formed by integrally bending a plate member made of an insulator. The slot may be formed in a length direction of the motor shaft, and the insulation member may be inserted into the slot along a length direction of the motor shaft. Rotor coils that wind the rotor cores may be disposed within the slot, and a molding member may be disposed within the space between the rotor coils. The insulation member may be formed symmetrically based on the central axis of the exposure passage.

A predetermined gap may be formed between end portions of first and second extension members, and the end portions of the first and second extension members may overlap by a predetermined distance. According to the exemplary embodiments of the present invention, an insulation member that separately covers an opening of a slot may be removed by extending an insulation member (e.g., insulation sheet) thereby forming an insulation member that may cover the opening of the slot. Therefore, according to the exemplary embodiments of the present invention, the number and a weight of the insulation members may be reduced, manage the insulation member may be one component, assembly costs may be reduced, and operation stability may be improved.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION

An exemplary embodiment of the present invention will hereinafter be described in detail with reference to the accompanying drawings. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicle in general such as passenger automobiles including sports utility vehicles (SUV), buses, trucks, various commercial vehicles, watercraft including a variety of boats, ships, aircraft, and the like and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, in order to make the description of the present invention clear, unrelated parts are not shown and, the thicknesses of layers and regions are exaggerated for clarity. Further, when it is stated that a layer is "on" another layer or substrate, the layer may be directly on another layer or substrate or a third layer may be disposed therebetween.

Figure 1:
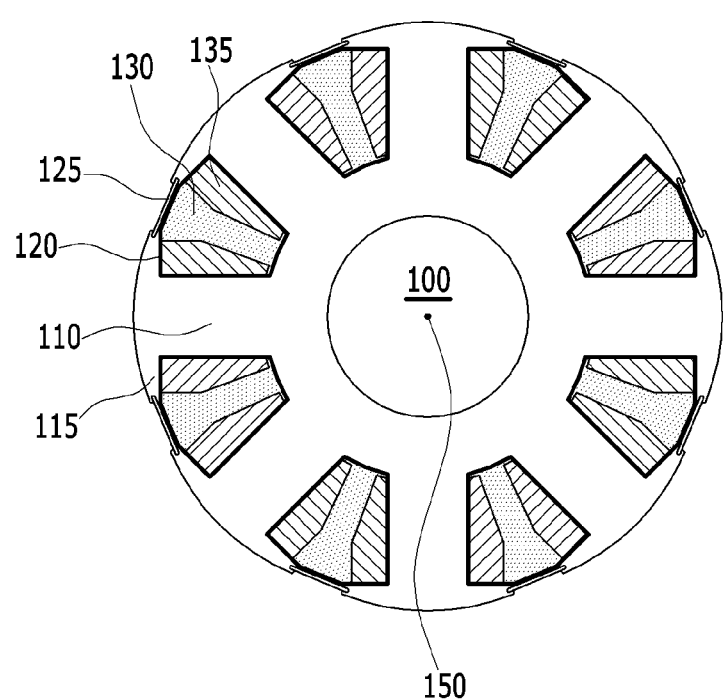
FIG. 1 illustrates an exemplary overall cross-sectional view of a motor unit having an insulation member according to an exemplary embodiment of the present invention.

FIG. 1 illustrates an exemplary overall cross-sectional view of a motor unit having an insulation member according to an exemplary embodiment of the present invention. Referring to FIG. 1, the motor unit may include a shaft 100, a rotor core 110, rotor coils 135, shoes 115, insulation members 120, and wedges 125. A virtual rotational axis 150 may be formed at a rotational center, and the shaft 100 of the motor may be disposed at the rotational axis 150. The rotor core 110 may be formed at an exterior circumference of the shaft 100 in a radial direction. Further, referring to FIG. 4, a slot 400 may be formed between the rotor cores 110. For example, the rotor core may be manufactured by stacking a plurality of metal plates. The shoes 115 may integrally protrude from an exterior end of the rotor core 110 in a rotation direction and an opposite rotation direction of the shaft 100. The insulation member 120 may be attached to an interior surface of the slot 400, and the rotor coil 135 winding the rotor core 110 may be disposed within the interior of the insulation member 120. A molding member 130 may be disposed (e.g., filled) between the rotor coils 135 within the slot 400.

Figure 4:
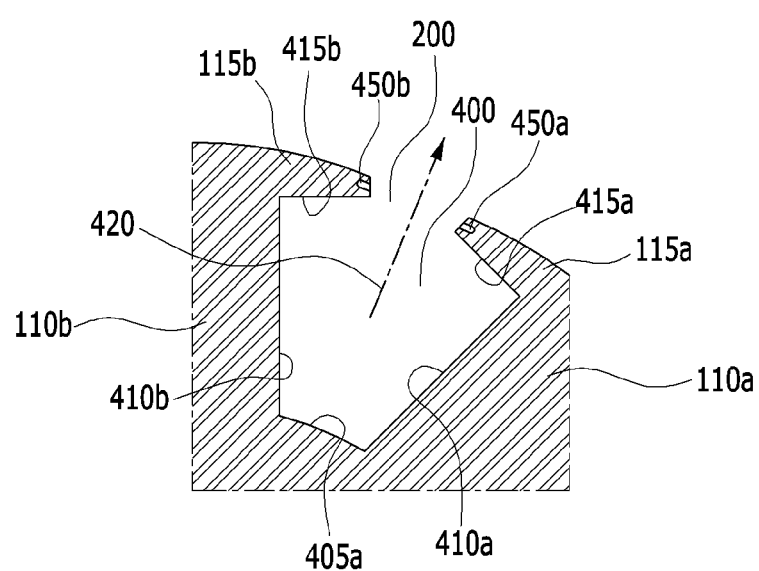
FIG. 4 illustrates an exemplary partial cross-sectional view of a shape of a slot of a motor unit having an insulation member according to an exemplary embodiment of the present invention.

Referring to FIG. 4, the wedge 125 may be disposed to close (e.g., obstruct) an exposure passage opened in an exterior direction within the slot 400, and the wedge 125 may be coupled (e.g., fixed) to an end portion of the shoe 115. The insulation member 120 may include a portion that corresponds to the wedge 125, and insulates between the rotor coil 135 and the shoe 115 and between the rotor coil 135 and the rotor core 110. In the exemplary embodiment of the present invention, the insulation member 120 may be formed by integrally bending one insulation plate, thereby reducing the number of parts, effectively preventing the insulation member 120 from being separated from the slot 400. Accordingly, the area and weight of the insulator may be reduced, and the assembly and maintenance costs thereof may also be reduced, owing to a reduction of the number of insulation members 120. Additionally, since the insulation member 120 may cover an exposure passage 200 of the slot 400, the rotor coil 135 may be thickly disposed, and insulation performance between the rotor coil 135 and the rotor core 110 may be further improved.

Figure 2:
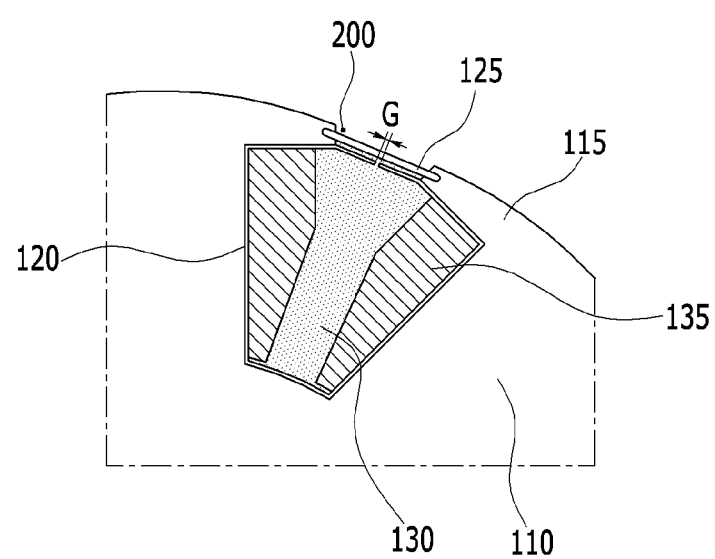
FIG. 2 illustrates an exemplary partially detailed cross-sectional view of a motor unit having an insulation member according to an exemplary embodiment of the present invention.

FIG. 2 illustrates an exemplary partially detailed cross-sectional view of a motor unit having an insulation member according to an exemplary embodiment of the present invention. Referring to FIG. 2, the insulation member 120 may be attached (e.g., fixed) to an interior surface of the slot 400 formed between the rotor cores 110, and the insulation member 120 may be formed in a portion that corresponds to an interior surface of the wedge 125.

The rotor coils 135 may be disposed respectively to correspond to the rotor cores 110 within the spaces surrounded by the insulation members 120. The molding member 130 may be disposed between the rotor cores 110. The molding member 130 may rigidly position (e.g., fix) the insulation member 120 and the rotor coil 135, and may prevent separation thereof. Additionally, the wedge 125 may be coupled (e.g., fastened) to the shoe 115 to close (e.g., obstruct) the exposure passage 200 that opens in a radial direction within the slot 400, to prevent the insulation member 120 and the molding member 130 from being separated to the exterior.

Figure 3:
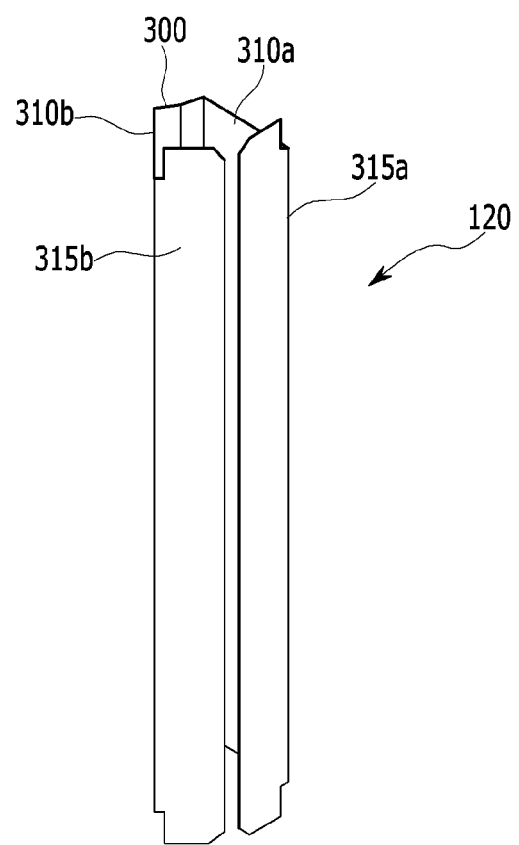
FIG. 3 illustrates an exemplary perspective view of an insulation member according to an exemplary embodiment of the present invention.

FIG. 3 illustrates an exemplary perspective view of an insulation member according to an exemplary embodiment of the present invention. Referring to FIG. 3, the insulation member 120 may include a bottom member 300, a first interior surface member 310a, a second interior surface member 310b, a first extension member 315a, and a second extension member 315b. The bottom member 300 may be disposed proximate to the shaft 100 within the slot 400 and the first and second interior surface members 310a and 310b may be disposed respectively within the rotation direction and the opposite rotation direction of the shaft 100 within the slot 400. Further the first and second extension members 315a and 315b may be integrally bent and formed within the first and second interior surface members 310a and 310b that correspond to an interior circumference of the shoe 115.

FIG. 4 illustrates an exemplary partial cross-sectional view of a shape of a slot of a motor unit having an insulation member according to an exemplary embodiment of the present invention. Referring to FIG. 4, the motor unit may include a first rotor core 110a and a second rotor core 110b that may extend in a radial direction at a central axis 420 of rotation, the slot 400 may be formed between the first and second rotor cores 110a and 110b, and the slot 400 may be formed symmetrically based on one central axis 420.

A first shoe 115a and a second shoe 115b may be positioned at end portions of the first and second rotor cores 110a and 110b, and the first shoe 115a and the second shoe 115b may extend in a direction of the central axis 420 of the slot 400. For example, the first shoe 115a may extend in the rotation direction of the shaft 100, and the second shoe 115b may extend in the opposite rotation direction of the shaft 100. The slot 400 may be formed by a bottom surface 405a formed proximate to the shaft 100, first and second interior surfaces 410a and 410b respectively formed in the rotation direction and the opposite rotation direction of the shaft 100 to be connected to the bottom surface 405a. Further, the first and second interior circumferences 415a and 415b of the first and second shoes 115, and the slot 400 may be exposed (e.g., protrudes) via the exposure passage 200 at a position that corresponds to the central axis 420.

A first groove 450a and a second groove 450b may be formed respectively within surfaces of the first and second shoes 115a and 115b adjacent (e.g., facing) to each other at the end portions of the first and second shoes 115a and 115b. Additionally, an end portion of the wedge 125 may be fixedly inserted into the first groove 450a and an end portion of the wedge 125 may be fixedly inserted into the second groove 450b.

In the exemplary embodiments of the present invention, the bottom member 300 of the insulation member 120 may contact (e.g., abut) the bottom surface 405a. The first and second interior surface members 310a and 310b may each contact the first and second interior surfaces 410a and 410b of the slot. The first and second extension members 315a and 315b may each contact the first and second interior circumferences 415a and 415b of the first and second shoes 115a and 115b and each may extend in a direction of the central axis 420 to cover the exposure passage 200. The first and second extension members 315a and 315b may contact (e.g., abut) the first and second interior circumferences 415a and 415b, as shown in FIG. 2, and end portions thereof may be respectively disposed with a predetermined gap (G) therebetween. Further, end portions of the first and second extension member 315a and 315b may overlap each other by a predetermined length.

While this invention has been described in connection with what is presently considered to be exemplary embodiments, it is to be understood that the invention is not limited to the disclosed exemplary embodiments. On the contrary, it is intended to cover various modifications and equivalent arrangements included within the spirit and scope of the appended claims.

DESCRIPTION OF SYMBOLS

100: shaft
110: rotor core
115: shoe
120: insulation member
125: wedge
130: molding member
135: rotor coil
150: rotational axis
200: exposure passage
300: bottom member
310a: first interior surface member
310b: second interior surface member
315a: first extension member
315b: second extension member
400: slot
405: bottom surface
410a: first interior surface
410b: second interior surface
415a: first interior circumference
415b: second interior circumference
420: central axis
450a: first groove
450b: second groove

What is claimed is:

1. A motor unit having an insulation member, comprising:
   rotor cores formed in a radial direction on an exterior circumference of a motor shaft and having a slot formed therebetween;
   a plurality of shoes protruding in a rotation direction and an opposite rotation direction of the motor shaft at an exterior end portion of each rotor core, and having an exposure passage formed therebetween;
   a bottom surface formed near the motor shaft within the slot;
   first and second interior surfaces respectively connected to the bottom surface and formed at the rotation direction side and the opposite rotation direction side of the motor shaft in the slot;
   an insulation member that contacts first and second interior circumferences of the shoes adjacent to the bottom surface and is disposed to close at least one portion of the exposure passage; and
   a wedge that obstructs the exposure passage,
   wherein the insulation member includes:
      a bottom member in contact with the bottom surface formed proximate to a central portion of the motor shaft within a space of the slot;
      first and second interior surface members integrally bent and formed at adjacent sides of the bottom member and contact first and second interior surfaces of the slot; and
      first and second extension members integrally bent and formed within the first and second interior surface members, respectively contact the first and second interior circumferences of the shoes, respectively extend from ends of the shoes in a direction of a central axis of the exposure passage, and form a gap between the first and second extension members, and
   wherein opposite end portions of the wedge are respectively coupled into grooves respectively formed in closest facing surfaces of the shoes adjacent to each other in the rotation direction of the motor shaft.

2. The motor unit having an insulation member of claim 1, wherein the rotor core, the shoe, and the wedge are each a conductor and the insulation member is an insulator.

3. The motor unit having an insulation member of claim 1, wherein the insulation member is formed by integrally bending a plate member made of an insulator.

4. The motor unit having an insulation member of claim 1, wherein the slot is formed in a length direction of the motor shaft, and the insulation member is inserted into the slot in a length direction of the motor shaft.

5. The motor unit having an insulation member of claim 1, wherein rotor coils that wind the rotor cores are disposed within the slot such that the rotor coil is apart from portions of the first and second extension members that contact the wedge, and a molding member fills a space between the rotor coils.

6. The motor unit having an insulation member of claim 1, wherein the insulation member is symmetrically formed based on the central axis of the exposure passage.

7. The motor unit having an insulation member of claim 1, wherein a predetermined gap is formed between end portions of first and second extension members.

8. The motor unit having an insulation member of claim 1, wherein the end portions of the first and second extension members overlap each other by a predetermined distance.

* * * * *